No. 781,559. PATENTED JAN. 31, 1905.
A. SCHMIDT.
NUT LOCK.
APPLICATION FILED MAR. 26, 1904.
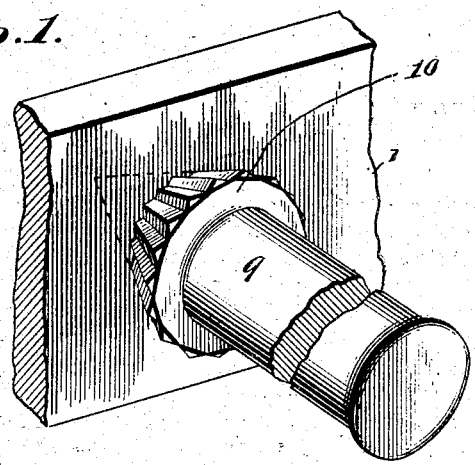
Fig. 1.
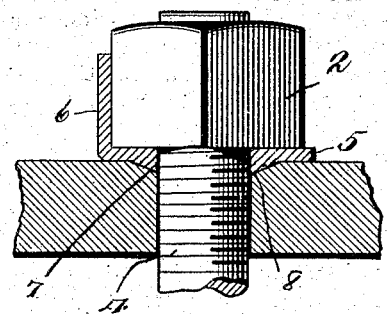
Fig. 2.
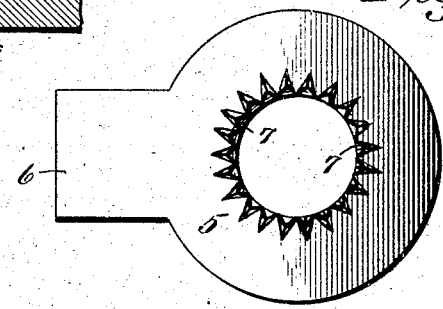
Fig. 3.
Fig. 5.
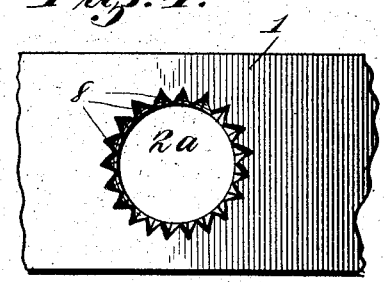
Fig. 4.
Inventor
Alois Schmidt.
Witnesses
By
Attorneys No. 781,559. Patented January 31, 1905.

UNITED STATES PATENT OFFICE.

ALOIS SCHMIDT, OF COVINGTON, KENTUCKY.

NUT-LOCK.

SPECIFICATION forming part of Letters Patent No. 781,559, dated January 31, 1905.

Application filed March 26, 1904. Serial No. 200,178.

*To all whom it may concern:*

Be it known that I, ALOIS SCHMIDT, a citizen of the United States, residing at Covington, in the county of Kenton and State of Kentucky, have invented certain new and useful Improvements in Nut-Locks, of which the following is a specification.

This invention relates to means for preventing accidental displacement of nuts applied to bolts used in connection with rail-joints, machinery, or elsewhere.

The essential feature of the invention resides in the provision of a peculiar lock-washer which coöperates with the nut to so engage the same that all likelihood of accidental displacement of the latter is obviated.

For a full description of the invention and the merits thereof and also to acquire a knowledge of the details of construction of the means for effecting the result reference is to be had to the following description and accompanying drawings.

While the essential and characteristic features of the invention are susceptible of modification, still the preferred embodiment of the invention is illustrated in the accompanying drawings, in which—

Figure 1 is a perspective view showing a fish-plate or like part having an opening therethrough to receive a bolt, the die which is used to form the grooves adjacent the peripheral portion of the opening in this part being shown in operative position. Fig. 2 is a vertical sectional view showing a nut in locked position adjacent the coöperating lock-washer. Fig. 3 is a bottom plan view of the lock-washer alone. Fig. 4 is a view in elevation to show more clearly the exact formation of the depressions upon the attaching part which receive the teeth of the lock-washer. Fig. 5 is a broken perspective view of the lock-washer, bringing out clearly the form of the teeth thereof.

Corresponding and like parts are referred to in the following description and indicated in all the views of the drawings by the same reference characters.

The invention as illustrated is shown in its adaptation in connection with a rail-joint structure, though it will be understood, however, that the same may be used in connection with any parts secured by means of bolts and nuts.

In the drawings the numeral 1 designates the adjacent fish-plate of the joint, against which the nut 2 is adapted to screw. The fish-plate 1 is provided with an opening $2^a$, as shown, through which passes the bolt 4, the latter being of any ordinary type which is now in common use. The lock-washer 5, by which the nut 2 is held from displacement, is interposed between the nut and the fish-plate 1, or whatever the part may be, through which the bolt passes; and this washer is provided with a flexible tongue 6, integrally formed therewith and adapted to be bent angularly from the plane of the washer into engagement with a side of the nut. In the specific means by which the washer 5 is rigidly positioned is found the important feature of my invention. This means consists of a plurality of peculiarly-shaped teeth 7, disposed upon the under side of the washer 5 and projected therefrom at the peripheral portion of the opening therein. The teeth 7 are of approximately triangular form in cross-section and projected radially from the opening of the washer, as before premised. The larger ends of the teeth 7 are adjacent the opening of the washer-plate, for reasons which will appear more fully as the description proceeds.

To more fully establish the interlocking connection between the washer-plate and the adjacent fish-plate 1, between which and the nut 2 said lock-washer is clamped, a tool is utilized to form depressions 8 in the fish-plate adjacent the peripheral portion of the opening $2^a$ of this member. The depressions 8 are formed by means of a tool 9, provided with a conical fluted die 10. The fluted portions of the die 10 are of a form somewhat corresponding to the triangularly-shaped teeth 7 of the lock-washer 5, and when this die is partially inserted into the opening $2^a$ of the fish-plate 1 a slight blow upon the tool will thereby form a plurality of depressions in the peripheral portion of this opening adjacent the outer side of the fish-plate 1. These depressions 8 are those which receive the teeth 7 and which, interlocking with these teeth, firmly prevent rotation of the lock-washer 5, and this latter element 5 being thus positioned the engaging tongue 6 thereof is thereby adapted to prevent unscrewing movement of the nut 2.

The bolt 4 having been passed through the attaching parts, the lock-washer 5 is slipped over the threaded end portion thereof against the fish-plate. The nut 2 is then screwed against the lock-washer, and the teeth 7 of the latter are forced into the depressions 8 adjacent the fish-plate opening. The disposition of the teeth 7 and their exact form is especially advantageous in that these teeth not only firmly position the washer by a wedge action against the fish-plate, but said teeth are equally spaced apart and entirely surround the openings of the washer, so as to admit of a nicety of adjustment of the same to allow the extension 6 to be turned upwardly against the nut at any point in a preferred disposition of the washer. The teeth 7 thus perform a dual function in that they lock the washer and serve to cause portions of the fish-plate to frictionally bite against the bolt. After the nut 2 has been screwed hard against the washer 5 the tongue 6 is bent upwardly against the side of the nut, and the latter is thus rigidly locked from movement.

Having thus described the invention, what is claimed as new is—

In combination with a fish-plate or like part provided with an opening therethrough, depressions formed upon the outer side of the fish-plate and surrounding the peripheral portion of the opening therein, a bolt passed through the opening in the fish-plate, a lock-washer disposed upon the bolt and having a flat unbroken outer side, triangularly-shaped solid wedge-teeth projected from the under side of the lock-washer at the peripheral portion of the opening in said washer, said teeth being equally spaced apart and extending radially from the said opening entirely surrounding the same and being received in the depressions of the fish-plate, a nut screwed upon the end of the bolt and hard against the outer flat side of the lock-washer, and an integral tongue extended from the washer into engagement with the nut.

In testimony whereof I affix my signature in presence of two witnesses.

ALOIS SCHMIDT. [L. s.]

Witnesses:
JNO. G. MEINERS,
AL. W. TIMMERDING.